United States Patent
Chang

(10) Patent No.: US 8,647,154 B2
(45) Date of Patent: Feb. 11, 2014

(54) NETWORK ADAPTER HAVING A NETWORK PLUG ON ONE SIDE OF A CIRCUIT BOARD AND A SET OF TERMINALS ON ANOTHER SIDE OF THE CIRCUIT BOARD

(76) Inventor: Nai-Chien Chang, New Taipei (TW)

( * ) Notice: Subject to any disclaimer, the term of this patent is extended or adjusted under 35 U.S.C. 154(b) by 265 days.

(21) Appl. No.: 13/152,464

(22) Filed: Jun. 3, 2011

(65) Prior Publication Data

US 2012/0002579 A1 Jan. 5, 2012

(30) Foreign Application Priority Data

Jul. 5, 2010 (TW) ................................ 99212742 U

(51) Int. Cl.
*H01R 25/00* (2006.01)

(52) U.S. Cl.
USPC .......................................................... 439/638

(58) Field of Classification Search
USPC ....................... 439/676, 638; 370/463; 385/92
See application file for complete search history.

(56) References Cited

U.S. PATENT DOCUMENTS

| 7,811,137 | B2 * | 10/2010 | Chang | 439/676 |
| 2004/0235356 | A1 * | 11/2004 | Chimiak | 439/638 |
| 2005/0208836 | A1 * | 9/2005 | Chao et al. | 439/638 |
| 2007/0206629 | A1 * | 9/2007 | Choi | 370/463 |
| 2013/0022321 | A1 * | 1/2013 | Chang | 385/92 |
| 2013/0051737 | A1 * | 2/2013 | Chang | 385/92 |

* cited by examiner

*Primary Examiner* — Chandrika Prasad
(74) *Attorney, Agent, or Firm* — Chun-Ming Shih; HDLS IPR Services

(57) ABSTRACT

A network adapter with a wireless network access function includes a wireless network access point router, a socket, a network plug, and a metallic cover. The wireless network access point router has at least one set of electrode terminals. The socket has at least one connecting port. The connecting port is provided with a plurality of insertion slots for allowing the electrode terminals to be assembled therein. The network plug is electrically connected to the wireless network access point router. The metallic cover is a hollow body. The rear side of the body has two foldable plates. The wireless network access point router, the socket and the network plug are assembled in the body of the metallic cover with the network plug being exposed to the outside of the body.

3 Claims, 6 Drawing Sheets

NETWORK ADAPTER HAVING A NETWORK PLUG ON ONE SIDE OF A CIRCUIT BOARD AND A SET OF TERMINALS ON ANOTHER SIDE OF THE CIRCUIT BOARD

BACKGROUND OF THE INVENTION

1. Field of the Invention

The present invention relates to a connector, in particular to a network adapter capable of getting on the Internet by a network cable and wirelessly.

2. Description of Prior Art

Currently, the existing computer is connected to a modem by a network cable, and then gets on the Internet by means of the modem. Usually, the modem is provided with one connecting port for allowing the network cable of one computer to be inserted therein. If a user needs a plurality of computers to get on the Internet simultaneously, the user has to use a router because the modem cannot allow the plurality of computers to get on the Internet simultaneously. The router is first connected to the modem. Then, the network cables of the plurality of computers are inserted into the connecting ports of the router. In this way, the plurality of computers can get on the Internet simultaneously.

In addition to have the connecting ports for allowing the network cables to be inserted therein, the existing router also has a wireless network access function. Thus, if the user's electronic device, such as a notebook computer or a mobile phone, is provided with an internal WLAN network card, the user can get on the Internet wirelessly via the router. However, the existing router has a specific volume and is usually installed in a house, the user often worries about the place where the router can be installed.

SUMMARY OF THE INVENTION

In order to solve the problems in prior art, the present invention combines a wireless network access circuit with a network connector in a reduced volume, so that it is more convenient to install and use. Further, the present invention can be taken to the outdoors for use.

The present invention provides a network adapter with a wireless network access function, including:

a wireless network access point router having a wireless network access antenna and a wireless network signal processing circuit for allowing a user to get on Internet wirelessly, the wireless network access point router having at least one set of electrode terminals;

a socket having at least one connecting port, the connecting port being provided with a plurality of insertion slots for allowing the electrode terminals to be assembled therein;

a network plug electrically connected to the wireless network access point router, the network plug allowing the network adapter to be inserted into another network socket; and a metallic cover having a hollow body, a rear side of the body having two foldable plates, the wireless network access point router, the socket and the network plug being assembled in the body of the metallic cover with the network plug being exposed to the outside of the body.

DETAILED DESCRIPTION OF THE INVENTION

The technical contents and detailed description of present invention will be made with reference to the accompanying drawings.

Figure 1:
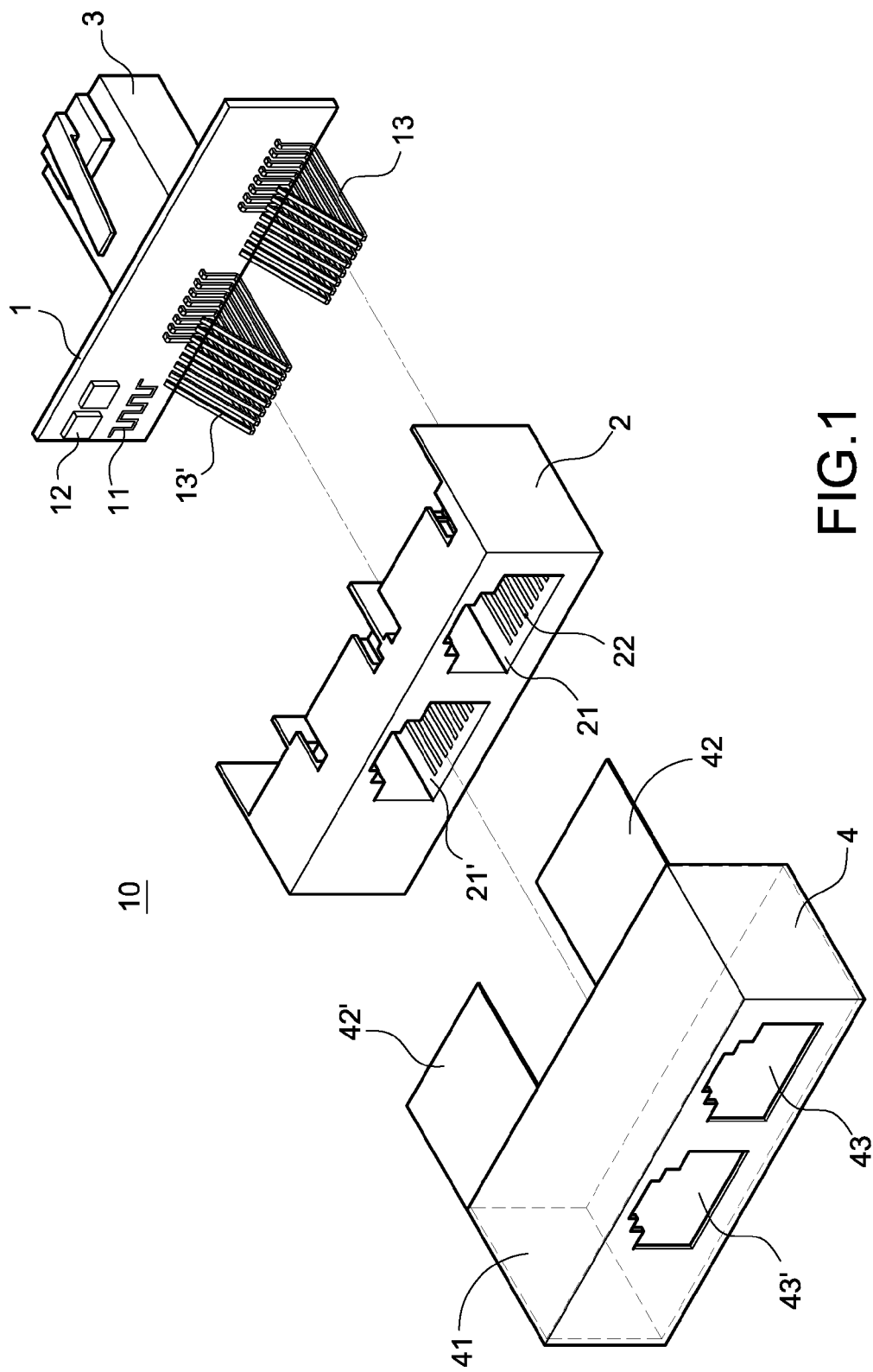
FIG. 1 is an exploded perspective view showing the network adapter of the present invention.
Figure 2:
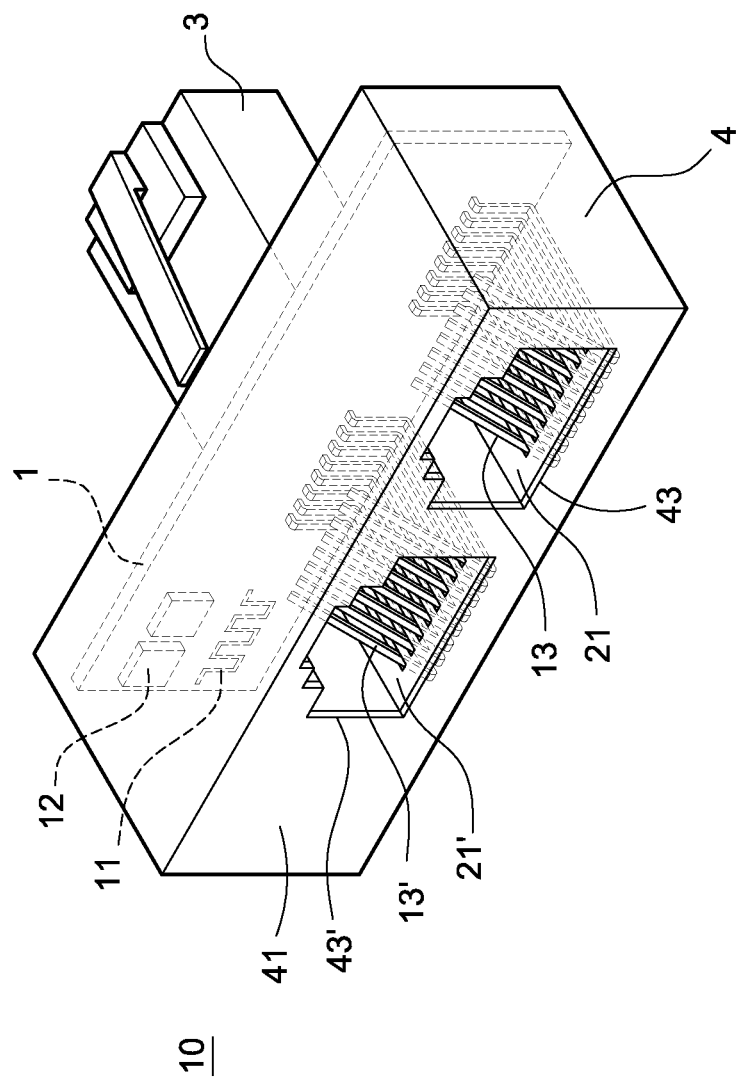
FIG. 2 is a perspective view showing the external appearance of the network adapter of the present invention.
Figure 3:
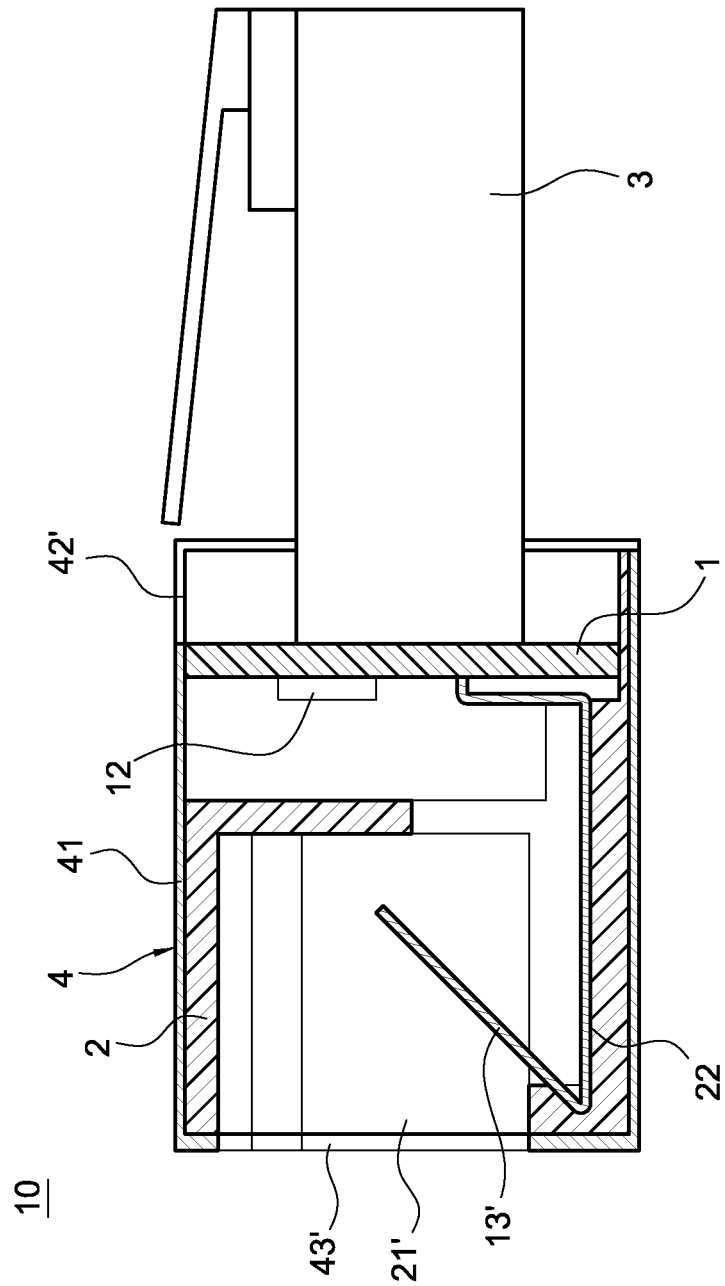
FIG. 3 is a side cross-sectional view showing the network adapter of the present invention.

FIG. 1 is an exploded perspective view showing the network adapter of the present invention. FIG. 2 is a perspective view showing the external appearance of the network adapter of the present invention. FIG. 3 is a side cross-sectional view showing the network adapter of the present invention. As shown in these figures, the present invention provides a network adapter 10 with a wireless network access function, which includes a wireless network access point router 1, a socket 2, a network plug 3 and a metallic cover 4.

The wireless network access point router 1 has a wireless network access antenna 11 and a wireless network signal processing circuit (integrated package circuit) 12 for allowing the user to get on the Internet wirelessly. The wireless network access point router 1 has at least one set of electrode terminals 13, 13'.

The socket 2 has at least one connecting port 21, 21'. The connecting port 21 is provided with a plurality of insertion slots 22 for allowing the electrode terminals 14 to be assembled therein. In the present embodiment, the socket 2 is of RJ45 or USB standard.

The network plug 3 is electrically connected to the wireless network access point router 1. The network plug 3 allows the network adapter 10 to be inserted into another network socket (not shown). In the present embodiment, the network plug 3 is of RJ45 or USB standard.

The metallic cover 4 has a hollow body 41. The rear side of the body 41 has two foldable plates 42, 42'. The front end of the body 41 has at least one through-hole 43, 43'. The wireless network access point router 1, the socket 2 and the network plug 3 are assembled in the body 41 of the metallic cover 4. Then, after the foldable plates 42 are folded downwards, the wireless network access point router 1, the socket 2 and the network plug 3 can be packaged in the body 41 with the network plug 3 being exposed to the outside of the body 41.

Figure 4:
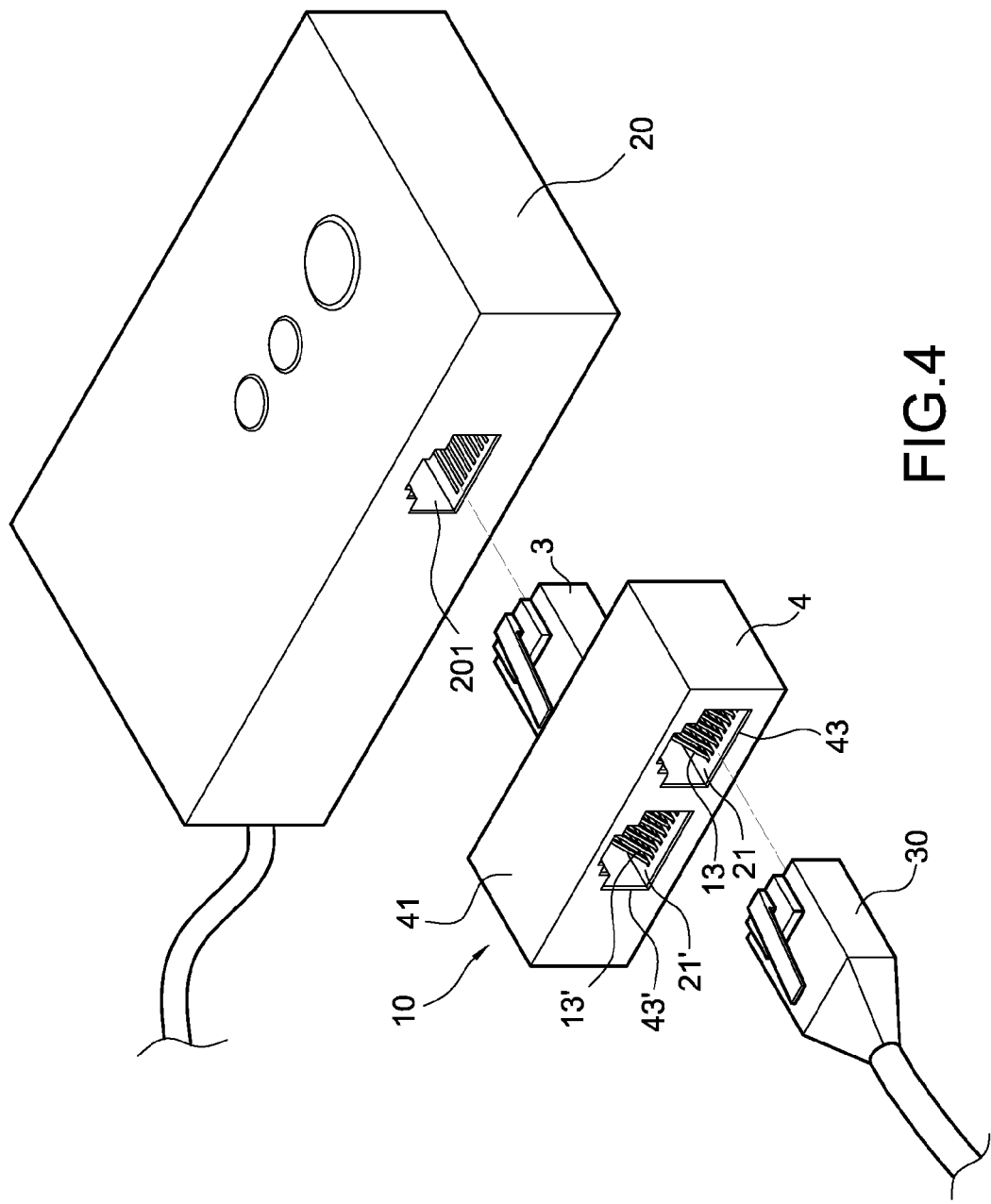
FIG. 4 is a schematic view showing an operating state of the network adapter of the present invention.

FIG. 4 is a schematic view showing the operating state of the network adapter of the present invention. As shown in this figure, when the network adapter 10 is in use, the plug 3 of the network adapter 10 is inserted into a connecting port 201 of a modem 20 (or a connecting port in a network socket provided on a wall). The modem provides the necessary electricity to the wireless network access point router 1. The two connecting ports 21, 21' of the socket 2 allows at least one network cable 30 to be inserted therein, so that a plurality of computers can get on the Internet simultaneously.

Figure 5:
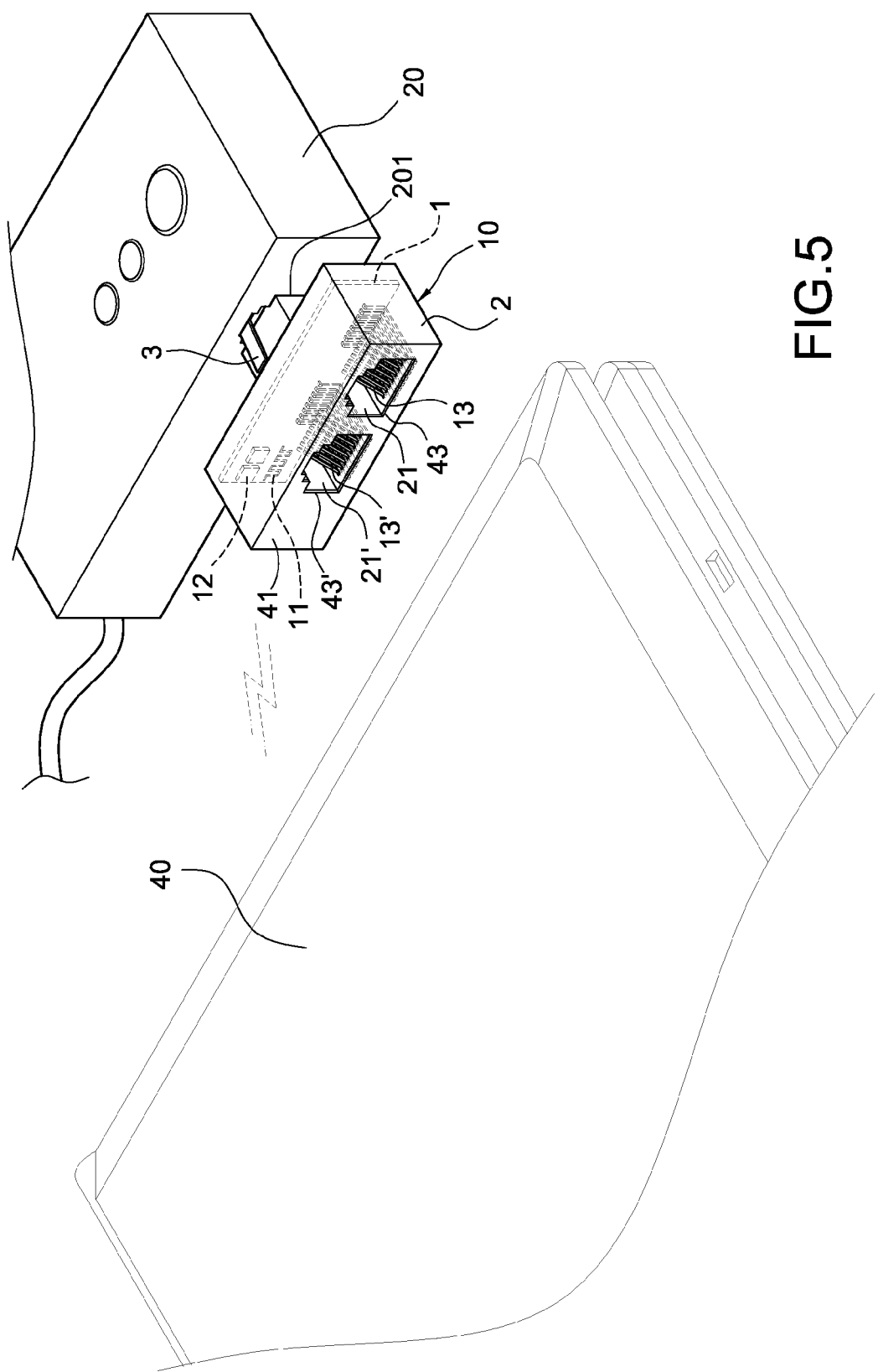
FIG. 5 is a schematic view showing another operating state of the network adapter of the present invention.

FIG. 5 is a schematic view showing another operating state of the network adapter of the present invention. As shown in this figure, when the network adapter 10 is connected to the modem 20 and the user's electronic device 40 (such as a notebook computer or a mobile phone) is provided with an internal WLAN network card, the user's electronic device 40 can get on the Internet via the wireless network access point router 1 of the network adapter 10.

Figure 6:
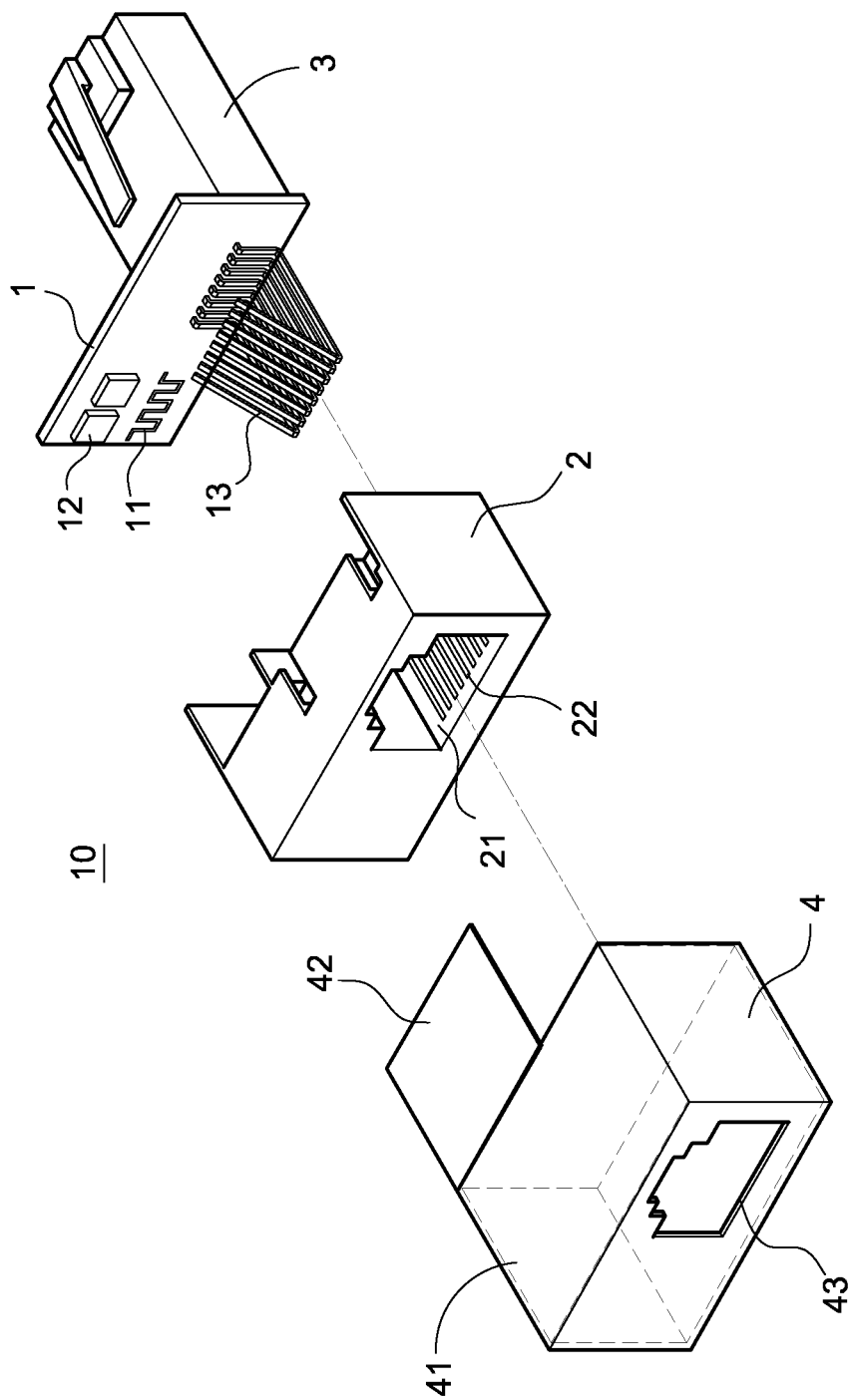
FIG. 6 is a schematic view showing another embodiment of the present invention.

FIG. 6 is a schematic view showing another embodiment of the present invention. The difference between the present embodiment and the previous embodiment lies in that: the wireless network access point router 1 has only one set of electrode terminals 13, the socket 2 has one connecting port 21, and the metallic cover 4 has one through-hole 43. Thus, the network adapter 10 of the present embodiment merely allows one network cable to be inserted therein.

The wireless network access point router 1 can be further provided with at least one filter circuit for processing noises in the signals.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A network adapter with a wireless network access function, including:
   a metallic cover of a hollow body, the hollow body having a foldable plate formed at one side and at least one through-hole formed at the opposite side;
   a wireless network access point router having a circuit board and at least one set of electrode terminals formed on one side of the circuit board;
   a socket having at least one RJ45 connecting port, the RJ45 connecting port being provided with a plurality of insertion slots for allowing the electrode terminals to be assembled therein so that the wireless network access point router is combined with the socket; and
   a RJ45 network plug formed on the opposite side of the circuit board, for being electrically connected to the wireless network access point router,
   wherein the socket is assembled in the hollow body to have the at least one RJ45 connecting port corresponding to the at least one through-hole so as to form at least one jack, and the foldable plate is folded on the socket to make the RJ45 network plug exposed out of the metallic cover.

2. The network adapter with a wireless network access function according to claim 1, wherein the wireless network access point router further includes a wireless network access antenna and a wireless network signal processing circuit formed on the circuit board.

3. The network adapter with a wireless network access function according to claim 2, wherein the wireless network access point router further includes at least one filter circuit formed on the circuit board.

* * * * *